(12) United States Patent
Morgan

(10) Patent No.: US 8,807,428 B2
(45) Date of Patent: Aug. 19, 2014

(54) NAVIGATION OF MOBILE DEVICES

(75) Inventor: Michael Morgan, Bristol (GB)

(73) Assignee: STMicroelectronics (Research & Development) Limited, Marlow, Buckinghamshire (GB)

( * ) Notice: Subject to any disclaimer, the term of this patent is extended or adjusted under 35 U.S.C. 154(b) by 287 days.

(21) Appl. No.: 13/253,827

(22) Filed: Oct. 5, 2011

(65) Prior Publication Data

US 2012/0085820 A1    Apr. 12, 2012

(30) Foreign Application Priority Data

Oct. 6, 2010 (GB) .................................. 1016820.1

(51) Int. Cl.
*G05D 3/00* (2006.01)
(52) U.S. Cl.
USPC ........................... 235/384; 235/375; 701/438
(58) Field of Classification Search
USPC ............................... 235/375; 701/28, 245, 438
See application file for complete search history.

(56) References Cited

U.S. PATENT DOCUMENTS

| 5,911,767 | A | 6/1999 | Garibotto et al. |
| 7,739,034 | B2 * | 6/2010 | Farwell .......................... 701/445 |
| 2004/0230340 | A1 | 11/2004 | Fukuchi et al. |
| 2007/0150097 | A1 | 6/2007 | Chae et al. |

FOREIGN PATENT DOCUMENTS

| GB | 2325807 A | 12/1998 |
| GB | 2398195 A | 8/2004 |
| WO | WO-2009098319 A2 | 8/2009 |

OTHER PUBLICATIONS

UK Search Report mailed Feb. 1, 2011 for GB 1016820.1 (4 pages).

* cited by examiner

*Primary Examiner* — Daniel Hess
(74) *Attorney, Agent, or Firm* — Gardere Wynne Sewell LLP

(57) ABSTRACT

A method is provided for navigation of a mobile device. Spatial information of at least one beacon detected in an image relative to the image is determined. The image includes an image of the at least one beacon within at least part of an environment surrounding the mobile device. A position of the mobile device based on said spatial information is determined using encoded visual information of the at least one beacon.

28 Claims, 8 Drawing Sheets

NAVIGATION OF MOBILE DEVICES

PRIORITY CLAIM

This application claims priority from Great Britain Application for Patent No. 1016820.1 filed Oct. 6, 2010, the disclosure of which is hereby incorporated by reference.

TECHNICAL FIELD

This application relates to mobile devices such as but not exclusively robots and in particular but not exclusively to methods for robots to self-navigate themselves around an environment such as an office or factory floor.

BACKGROUND

Several uses for mobile devices capable of navigating around an environment such as an office or a factory floor have been proposed. Some methods for allowing a mobile device to perform such navigation are known.

One such method is through the use of active beacons installed in the environment in which the mobile device is required to navigate. Active beacons may take several forms, for example transponders buried beneath the floor or radio beacons scattered around a building. A mobile device calculates its position based on the angle of incidence of the signal received from the beacon and the timing data associated with the signal. Timing data of the signal is used to calculate distance of the mobile device to the signal.

A further method for self-navigation of mobile devices is through the use of artificial/natural landmarks. This method requires a very high level of image processing because landmarks must be recognized by the mobile device. Furthermore the mobile device is required to identify moving objects in the environment in order to avoid collisions. In the case of artificial landmarks, the actual surroundings must be modified with artificial landmarks being inserted into the environments. These landmarks will be such that image processing circuitry in the mobile device will be able to easily identify their shape and color. An example of these landmarks is including the tape on the floor which forms a continuous landmark for the mobile device to follow.

Model matching has also been proposed as a self-navigation system. In model matching the mobile device uses sensors to build up a model of the surrounding environment. This model is matched against a global model stored in the mobile device memory to determine the position of the mobile device. This method is process intensive and requires sophisticated image processing capabilities.

Simpler methods for self-navigation involve relative position measurements. In relative position measurements the motion and direction of travel of the mobile device is recorded through for example encoders capturing wheel rotation or steering orientation or gyroscopes and accelerometers. The mobile device then estimates its position based on a start position and these parameters.

Existing visual based self-navigation systems are complicated and processor intensive requiring a high level of image processing capabilities. Active beacons require both a time measurement of the beacon signal and an angle of incidence of the signal which is susceptible to interference and requires a high accuracy in the decoding equipment. Visual systems and to a lesser degree active beacons tend to be expensive. The existing cheaper simpler systems of relative position measurement are less accurate and take into account only the motion of the mobile device itself.

SUMMARY

According to a first aspect of the invention there is provided a method for navigation of a mobile device comprising: determining spatial information of at least one beacon detected in an image relative to the image; and determining a position of the mobile device based on said spatial information; wherein said determining spatial information is based on encoded visual information of said at least one beacon and said image comprises an image of said at least one beacon within at least part of an environment surrounding the mobile device.

The method may further comprise detecting said at least one beacon within the image based on said encoded visual information indicating a position of said at least one beacon relative to the environment.

The method may further comprise: determining a position of the at least one beacon relative to the image based on said spatial information; and determining a position of the at least one beacon relative to the environment based on said encoded visual information.

The determining a position of the mobile device may further comprise determining an absolute position and orientation of the mobile device.

The beacon may be an infrared beacon and said encoded visual information may be decoded using image processing on said image. The encoded visual information may indicate an identity of the beacon.

The method may further comprise matching said identity of said beacon with a position of the beacon relative to the environment stored in a memory of the mobile device. The spatial characteristics further correspond to at least one of the size of the beacon within the image, the orientation of the beacon with respect to the image.

The method may further comprise: determining spatial information of at least one further beacon wherein said spatial information comprises an indication of a spatial relationship between the at least one beacon and said at least one further beacon; and determining a position of the mobile device based on said spatial information.

The image may have a 360 degree field of vision of the surrounding environment and all of said beacons within said environment are within the image.

The beacon may be a barcode visible only in infrared light and said encoded visual information may be encoded in the barcode. The beacon may further comprise two indicators on either side of the barcode and may further comprise: recording a first image of the beacon in normal light and a second image of the beacon in infrared light, wherein a comparison is made between the two images to determine if the indicators are only present in the second image and image processing is carried out to detect a barcode between the two indicators.

The two indicators may indicate an orientation of the barcode with respect to the mobile device and a comparison between a stored orientation of the barcode and said orientation with respect to the mobile device may be carried out to determine an orientation of the mobile device.

According to a second aspect, there may be provided an apparatus comprising: processing means operable to determine spatial information of at least one beacon detected in an image relative to the image and determine a position of the mobile device based on said spatial information; wherein said processing means determines said spatial information based on encoded visual information of said at least one beacon and said image comprises an image of said at least one beacon within at least part of an environment surrounding the mobile device.

According to a third aspect, there may be provided a computer readable medium comprising computer instructions for: determining spatial information of at least one beacon detected in an image relative to the image; and determining a position of the mobile device based on said spatial information; wherein determining said spatial information is based on encoded visual information of said at least one beacon and said image comprises an image of said at least one beacon within at least part of an environment surrounding the mobile device.

BRIEF DESCRIPTION OF THE DRAWINGS

Some embodiments will now be described by way of example only with reference to the accompanying drawings in which.

DETAILED DESCRIPTION OF THE DRAWINGS

Figure 1:
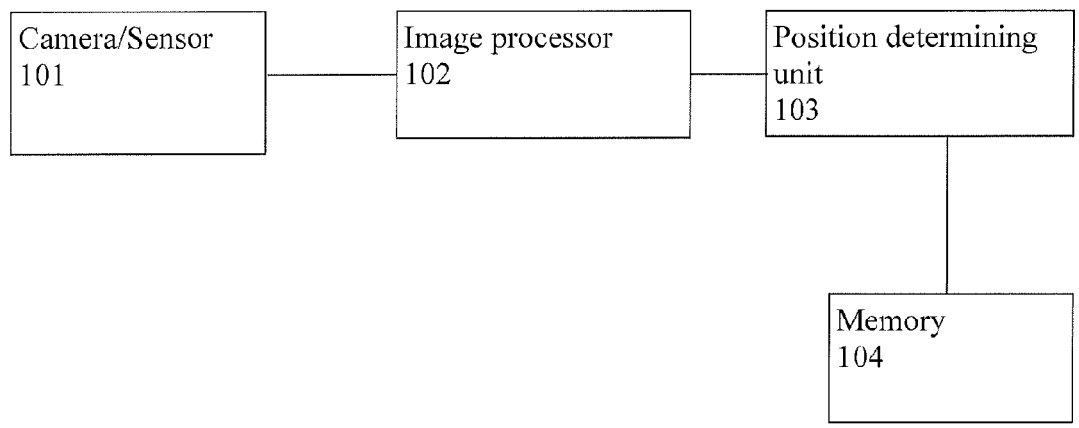
FIG. 1 shows a component diagram of the position system according to an embodiment.

FIG. 1 shows components of a positioning system according to an embodiment. The positioning system 100 may be implemented in any robot or mobile device or the like for determining the device's position and may provide navigation information to the robot or mobile device.

Camera/sensor 101 may be a camera that is able to record images of the surrounding environment. The camera may be an infrared camera, a charge-coupled device CCD camera or the camera/sensor 101 may be any applicable sensor that may record an image of the surrounding environment. The camera/sensor 101 is connected to an image processor 102. The image processor 102 may be any processor capable of carrying out image processing operations. In some embodiments the image processor may only be capable of carrying out low-level image processing and may not require many resources. In embodiments the image processor may be capable of detecting a contrast between light and dark pixels.

Image processor 102 is connected to a position determining unit 103. The position determining unit 103 receives information from the image processor 102 regarding the image as recorded by camera/sensor 101 and uses the received information to determine a position of the mobile device. The position determining unit 103 is further connected to a memory 104. The memory 104 may be capable of storing information regarding at least the environment, identities of beacons picked up in the environment, routes that the mobile device may take and/or any other information in order to assist the mobile device in navigation.

Figure 2:
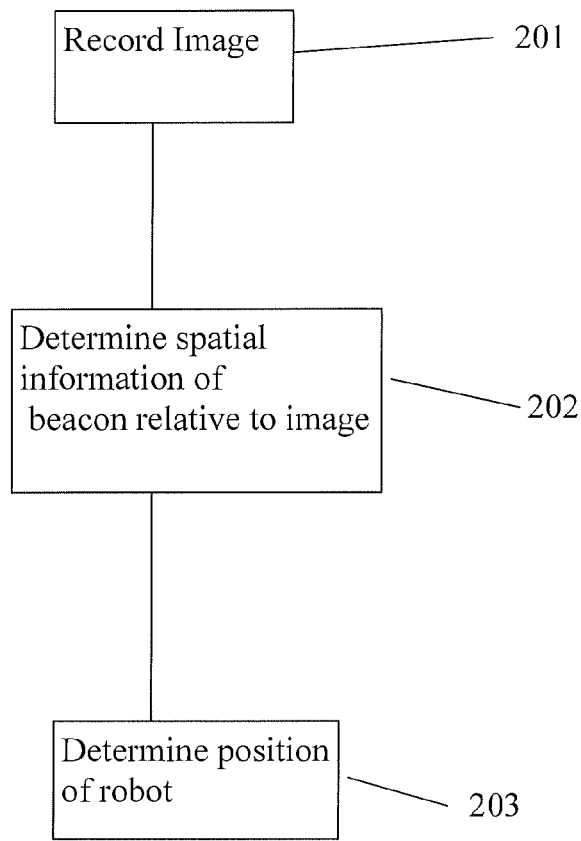
FIG. 2 shows a flow chart of a method of one embodiment.

FIG. 2 provides a diagram that shows a method carried out by an embodiment. At step 201 of the method, an image of the surrounding environment or at least part of the surrounding environment is recorded by the camera/sensor 101. In some embodiments the camera may be a CCD camera or any camera capable of recording images in infrared light. As later discussed in relation to further embodiments, the camera may have a 360° field of vision or may have a limited field of vision in order to record an image of only a limited area in relation to the mobile device.

The image recorded in step 201 may record a beacon. A beacon may be a visual indicator within the surrounding environment and may comprise encoded visual information. In embodiments the encoded visual information of the beacon may indicate an identity of the beacon or a position of the beacon in the surrounding environment. As later discussed in relation to the further embodiments these beacons may be implemented in several forms. The beacons may have visual indicators of some encoded visual information.

At step 202, the image processor 102 processes the image and determines spatial information regarding any beacon detected in the image. A visual beacon may be easily identifiable to the image processor as the beacon provides encoded visual information. For example, in some embodiments the beacon may be visible only in infrared light. The beacon may be easily detectable in the resulting image as the pixel contrast between non-infrared and infrared light is great. This may reduce the resources needed for the image processor as the beacon may be detected using low-level image processing.

Further at step 202 the image processor 102 determines spatial information of the beacon relative to the image. For example, the spatial information may be the size of the beacon relative to the image, a distance between the beacon and any further beacons detected in the image and/or an orientation of the beacon based relative to the image.

After spatial information is determined for any beacons in the image, the method progresses to step 203 where a position of the mobile device is determined based on the spatial information of at least one beacon relative to the image. In one embodiment, the image processor 102 passes spatial information to the position determining unit 103 which calculates a position of the mobile device based on the spatial information.

In some embodiments the image processor 102 decodes the encoded visual information of the beacon and determines an identity of the beacon. The position determining unit 103 is capable of matching this identity of the beacon with an absolute position of the beacon stored in the memory 104. The absolute position of the beacon is the position of the beacon within the surrounding environment and differs from the spatial information which may relate to a position of the beacon relative to the image. This absolute position of the beacon may also used to determine the position of the mobile device.

Alternatively in other embodiments, the encoded visual information of the beacon may contain an explicit absolute position of the beacon. In other words the position of the beacon in relation to the surrounding environment may be encoded in the visual information. The image processor 102 then need just decode the encoded visual information and pass the absolute position to the position determining unit.

Figure 3:
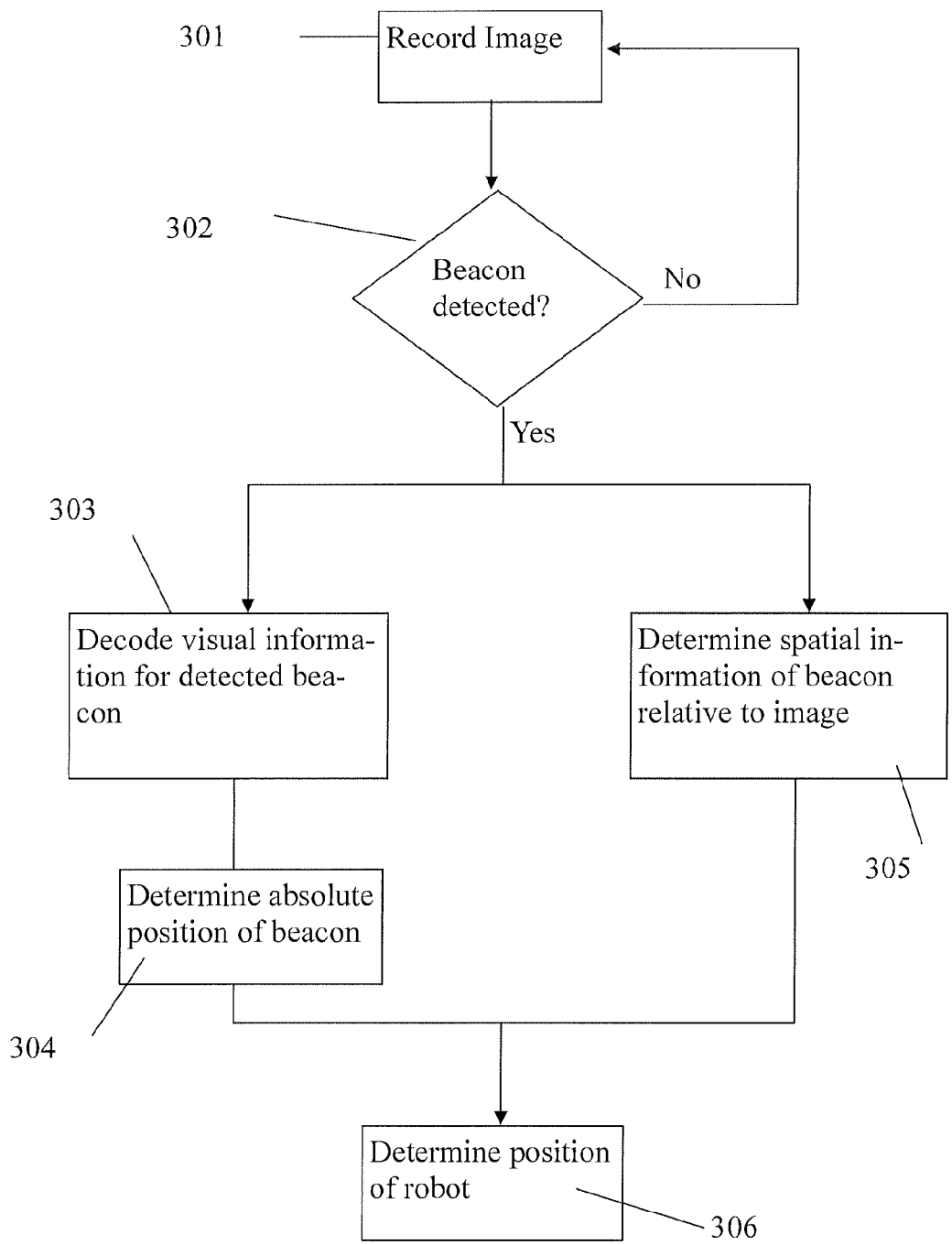
FIG. 3 shows a flow diagram of a more detailed method of an embodiment.

FIG. 3 discloses a more detailed method in accordance with some embodiments. In FIG. 3 an image is recorded by the camera/sensor 101 in step 301. This may correspond to step 201 in FIG. 2. The method then progresses to step 302 where a determination is made whether any beacons are detected within the image by the image processor 102.

If no beacons have been detected, the method returns to step 301 and records another image. It may be appreciated that in the case of no beacons or less than a specified number of beacons are detected, the camera may change its orientation or the mobile device may move such that the camera has a different field of vision. However in some embodiments the beacon distribution throughout the surrounding environment may be such that a beacon will always be visible to the camera/sensor 101. It will also be appreciated that more than one beacon may be detected and the method may be such that the image is rerecorded until a specified number of beacons are detected. Additionally if no beacons are detected the mobile device may continue on a current navigation path until additional beacons are detected.

If a beacon or the specified number of beacons are detected at step 302, the method splits into a left branch of steps 303 and 304 and a right branch of step 305. In step 303, visual encoded information of the beacon(s) detected by the image processor is decoded. The encoded visual information may be any suitable form of encoded visual information. For example the encoded visual information may be a visual pattern that can be recognized by the image processor 102. Alternatively the encoded visual information may be a series of flashes or a particular shape.

The visual information is decoded by the image processor 102 to identify the beacon(s). The position determining unit 103 identifies the beacon based on the decoded visual information of that beacon. The position determining device 103 may determine an absolute position of the beacon in step 304. As previously discussed this may be by matching an identity of the beacon to an absolute position for the beacon in a memory or may just be the explicit reception of the absolute position of the beacon from the image processor 102.

It will be appreciated that the beacon identification and determination of the absolute position of the beacon may be carried out for every beacon detected within the image. Alternatively only up to a specified number of beacons may be identified and absolute position determined. It will be appreciated that the number of beacons that are identified and absolute position determined may correspond to the number of beacons required to produce accurate position information for the mobile device.

In the right branch, at step 305 the recorded image is analyzed by the image processor 102 and spatial information of the beacon is determined relative to the image. As discussed this may be the distance between beacons, the size of beacons relative to the image, etc. At step 306 the absolute position of the identified beacons from step 304 and the spatial information from step 305 are combined and the position determining unit 103 determines a position of the mobile device. It will be appreciated that the left and right branch may not be entirely independent and in some embodiments the spatial information of the beacon may be determined based on the absolute position of the beacon. In some embodiments steps 303, 304 and 305 are may be carried out sequentially.

It will be appreciated that in some embodiments an image is processed to determine both a spatial relationships of a beacon within the image and to decode any encoded information. Embodiments may therefore determine an absolute position of a beacon as well as a distance of the beacon from the robot or mobile device from an image.

Figure 4:
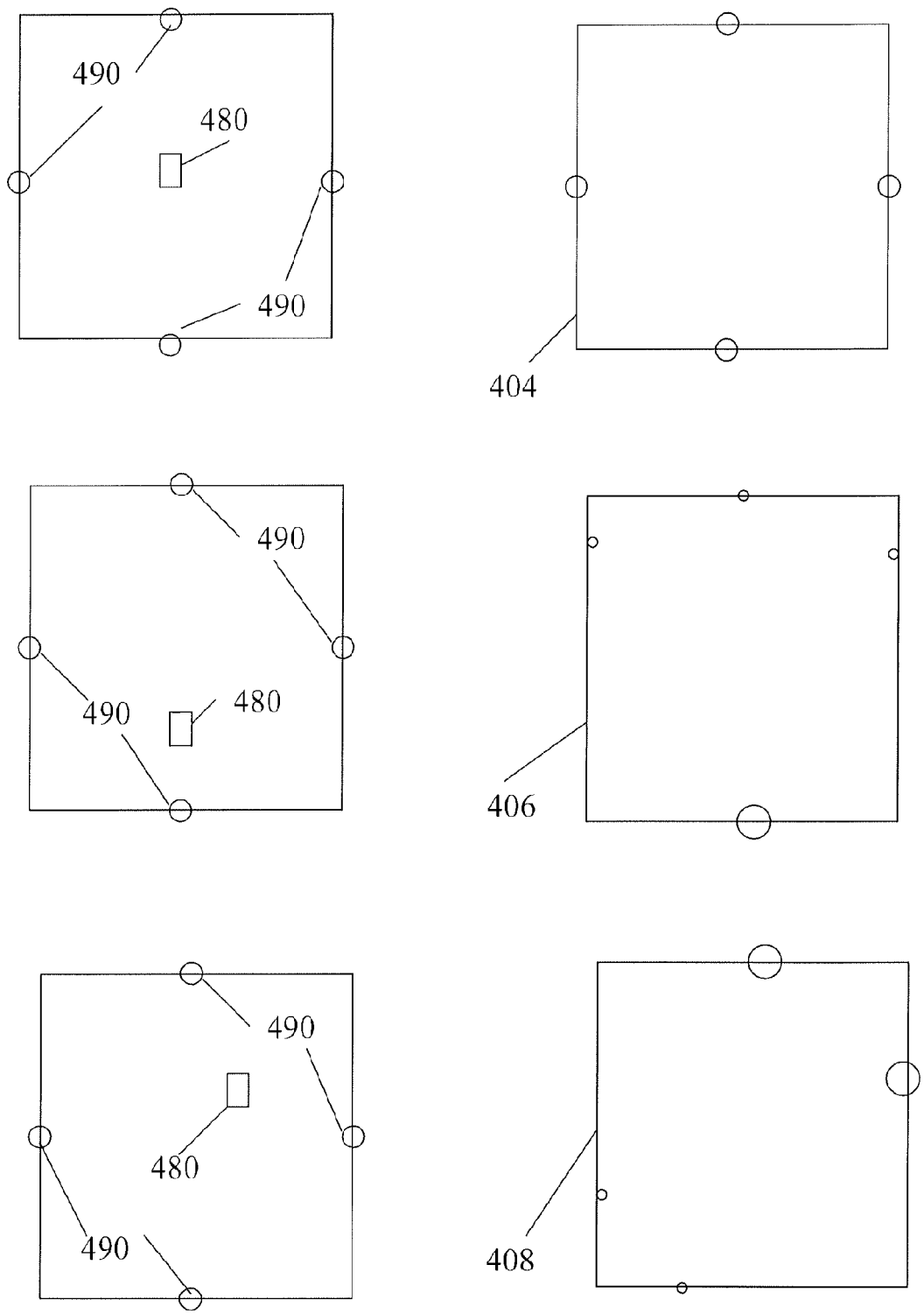
FIG. 4 shows an aerial diagram of a mobile device within a room of beacons as well as corresponding images processed by that mobile device.

FIG. 4 shows an aerial view of the position of the robot or mobile device within an environment incorporating beacons according to a particular embodiment of the present application and also shows the corresponding image and spatial calculations recorded by the mobile device.

Three situations are shown in FIG. 4. In environment 401 a robot 480 is in the center of the room. In environment 402 the robot 480 is towards a front of the room. In environment 403 the robot 480 is towards the top right corner of the room. In each of the environments 401, 402, 403, beacons 490 are placed on each of four boundaries to the environments 401, 402, 403. In this embodiment robot 480 has camera/sensor 101 pointing upwards such that the camera/sensor 101 has a 360 degree field of vision. Beacons 490 may be placed on the edges of the ceiling. It will be appreciated that the camera is not restricted to such a position as discussed in relation to some further embodiments.

Images 404, 405 and 406 represent images that may be taken by the camera/sensor 101 of robot 480 in respect of the robot position in environments 401, 402 and 403. The functioning of this particular embodiment will be described with reference to FIG. 5 which shows one example of method steps that may be carried out in a first embodiment of the present application.

Figure 5:
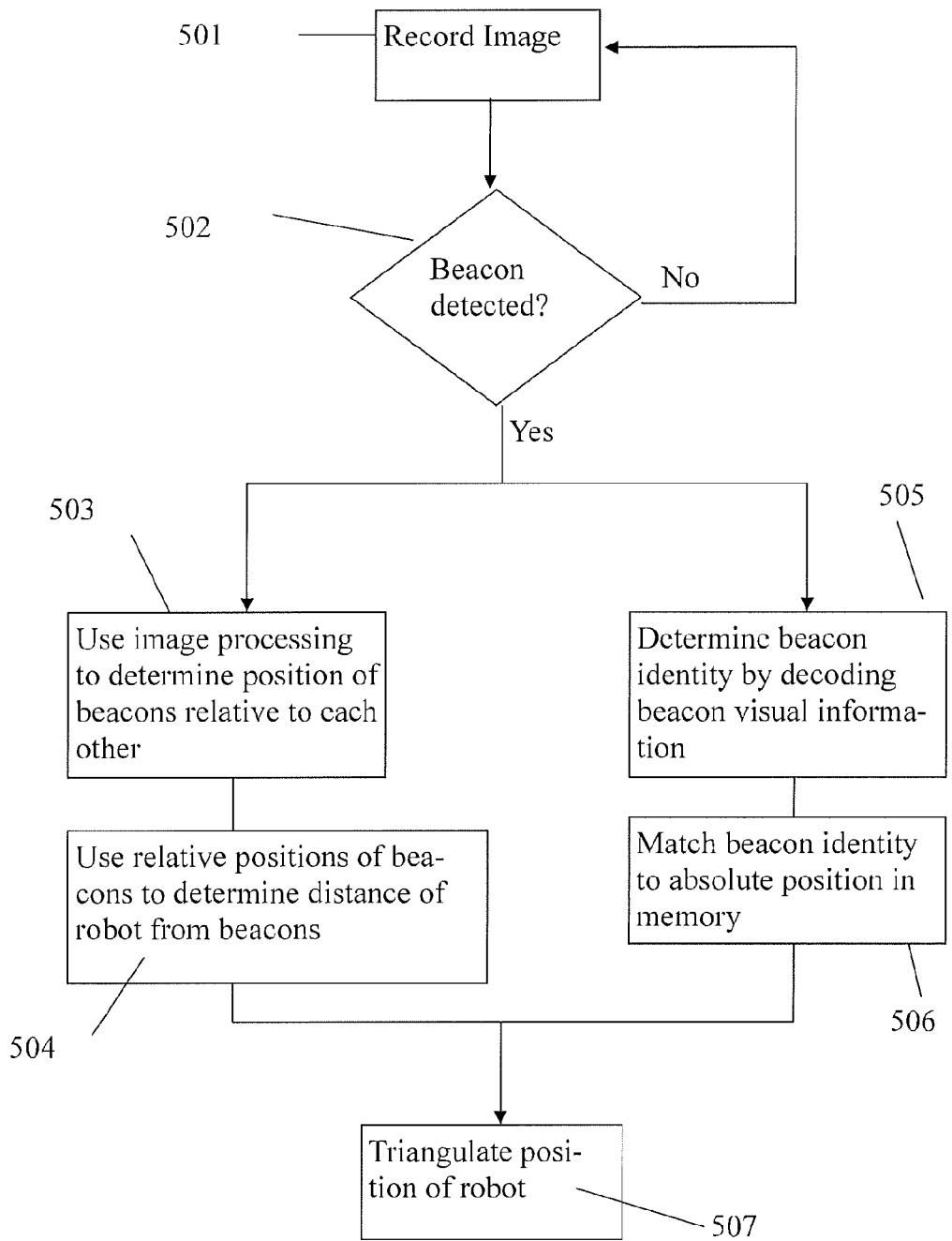
FIG. 5 shows a method diagram laying out the method steps of an embodiment.

When robot 480 wishes to determine its position in any of the environments 401, 402, 403, the robot records an image in step 501 of FIG. 5. This step may correspond to step 201 or 301. Once the image is recorded it is determined whether there are any beacons present in the image according to step 502. This step may correspond to step 302. If no beacon is detected, the method returns to step 501. It will be appreciated however that this step may be optional as the beacons may be distributed such that a beacon will always be visible to camera/sensor 101. Alternatively the image may be rerecorded until a specified amount of beacons have been detected in the image.

In the environment 401 of FIG. 4 it is apparent that in image 404 recorded by robot 480, all four beacons are visible and have an equidistance spatial relationship as the robot 480 is in the center of the environment 401. In image 405, the robot 480 is near the bottom of environment 402 and bottom beacon 490 appears larger and spaced further away from the remaining three sensors than in image 404. In image 406, the robot 480 is in the top-right hand corner of environment 406 and the top and right beacons appear larger and closer to robot 480 than the bottom and left beacons 490. It would be appreciated that these images are by way of example only and the imaging processing circuitry may not be depict these images as shown.

Returning to the method of FIG. 5, once beacons have been detected in an image the method splits into two branches. A left branch comprises step 503 where image processing circuitry 102, 103 determines a position of the beacons relative to each other. This may correspond to step 202 and/or 305. The position of the beacons relative to each other can be seen in FIG. 4 by dashed lines 407.

The method then progresses to step 504 where the relative positions of the beacons as determined by dashed lines 407 are used to calculate the distance of the robot 480 relative to each beacon 490. This may correspond to step 203 and/or 305.

Step 505 of the right branch of FIG. 5 identifies the beacon(s) by decoding encoded visual information of the beacon(s). According to one example the beacons may be infrared light emitting diode LED beacons and the encoded visual information is a series of flashes according to a specific pattern of frequency. This type of information can be identified by an image processor using low level image processing. However it will be appreciated that other types of beacons with other encoded visual information may be used in accordance with this embodiment. For example beacons that emit light in other spectrums may be used, or alternatively passive beacons (that do not emit light) visible in a range of light spectrums may be used. Furthermore the beacons need not be LED beacons but may include other light sources.

Once the beacons are identified the method progresses to step 506 where an identity of each beacon is matched to an identity corresponding to an absolute position in the memory 104. The method then progresses to step 507 where the relative position of the beacons and the absolute position are passed on to the position determining unit 103 which then triangulates the position of the robot 480 based on the position of the robot 480 relative to the identified beacons as well as the absolute position of the beacon provided by the encoded visual information.

It will be appreciated that FIG. 5 gives an example of the processing steps that may be used to determine a position of the robot. In some embodiments the determination of step 504 may receive an absolute position of the beacons as shown by dashed line 508. It will be appreciated that while FIG. 4 shows four beacons in the environment 404 to 404, only three beacons may be required in order to triangulate a position. In embodiments additional or less beacons may be used.

Figure 6:
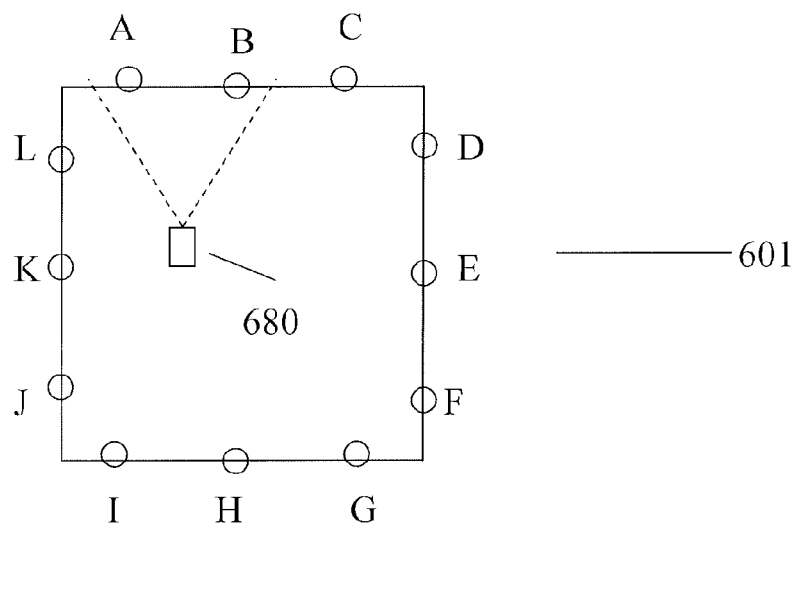
FIG. 6 shows an aerial view of the mobile device in orientation in a room with beacons according to a further embodiment.
Figure 6:
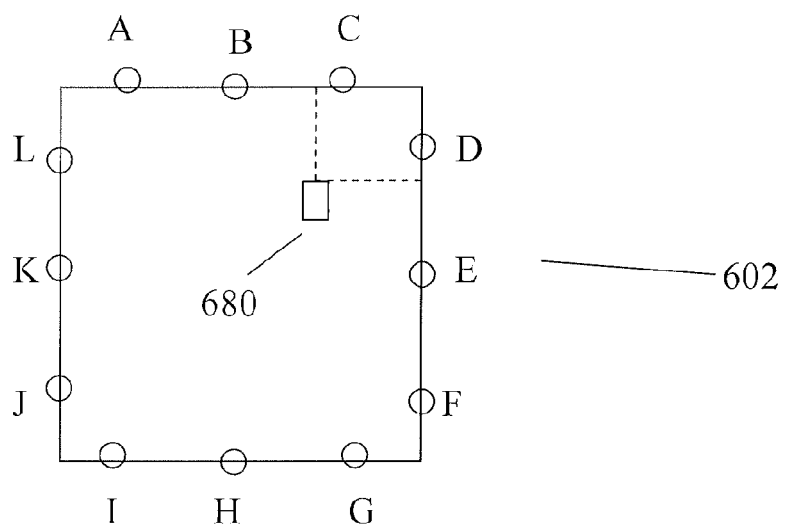
Figure 6:
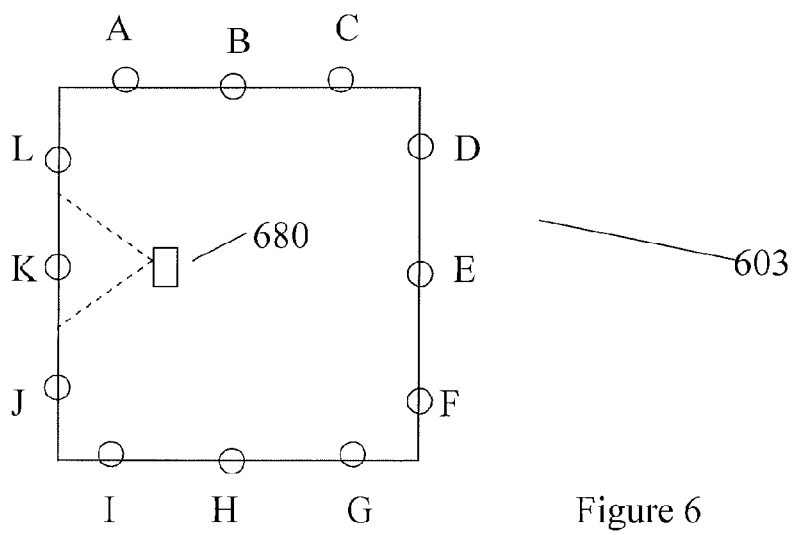

The above embodiment has been described in relation to a camera/sensor 101 with a 360 degree field of vision. In one alternative, the camera/sensor 101 may have a partial field of vision of the surrounding environment. In this embodiment not all of the beacons in the environment will be visible to a robot or mobile device at one time. FIG. 6 shows an aerial view of a robot in accordance with this partial field of vision embodiment.

In FIG. 6, the field of vision of a robot 680 may be restricted to a specified angle. This allows beacons A to L to be distributed around the environment 601, 602 and 603 such that only a specific combination of beacons A to L will be visible to the robot 680 for each orientation and range of position. In this embodiment robot 680 can determine its position based solely on the identity of the beacons that it can see as that combination of beacons maps to a particular orientation and position range. This embodiment is particularly applicable to systems where cheap mobile devices and lower accuracy is required.

The robot 680 may determine its position by recording an image of the surrounding environment and match the identity of the beacons that are detecting within the image to a position of the robot 680 in memory 104. The memory may contain combinations of beacon identities mapped to a position and orientation of the robot 680 that corresponds to the visibility of those beacons. Additionally robot 680 may determine a distance from the beacons based on spatial information according to the recorded image to determine its position more accurately.

In FIG. 6, environments 601, 602 and 603 are shown with the robot 680 in various positions. In environment 601 the orientation of the robot 680 is upwards and such that only beacons A and B are visible. In environment 602 the robot is oriented such that only beacons C and D are visible. In environment 603 the robot 680 is orientated such that only beacon K is visible. In this embodiment the number of beacons provided must correspond to a range of positions for the robot 680 for each unique combination of beacons visible to robot 680. In some embodiments, the position of the robot 680 within the range of positions may further be calculated by the relative size of the beacons appearing in the image and the orientation and position of the beacons within the image.

In the above embodiments the position of a robot may be determined using relative positions of beacons within an image. As such, image analysis may be capable of resolving the position of a robot 480, 680 within a pixel. Therefore the accuracy of the robot 480, 680 position may dependent on the pixel capabilities of the camera or sensor used.

In the above described embodiments, a robot may be capable of determining its position while moving. In this case the image recorded for example in step 201, 301 and 501 may be recorded with a short exposure of camera/sensor 101. In some embodiments the beacons may be synchronized to ensure that they are illuminated at the same time. In some embodiments robot 480, 680 determines identities of each beacons before moving and thereafter detects its position on the move based on known identities of the beacons as well as the relative position of the beacons in further images taken while moving.

In the above embodiments beacons have been described having visual information identifying a beacon. In some embodiments beacon may carry further information such as an indication of a charging station at the location of the beacon, or an indication that the robot should return to a specified position. This information may be provided by the coded information in addition to the identity of the beacon. For example the identity may be cross-referenced in memory 104 to determine a position of the beacon and an indication of a charging station at that point.

In some embodiments the robot 480, 680 may also be capable of mapping beacon positions within a building when a navigation system is first installed or extended. In embodiments, when a system is installed, the absolute position of a beacon corresponding to an identity of that beacon may need be mapped into memory 104. In order to provide this mapping, a mobile device may be used to determine spatial information of the beacons from an image. For example the mobile device may determine the spatial relationship between the beacons and the robot from an image. The mobile device may be aware of its own absolute position.

The mobile device may then move a set distance known to the mobile device and determine the spatial information of the beacons within an image taken from the second position. From this, the mobile device may determine the absolute position of the beacons in the environment.

In some embodiments the mobile device may store the absolute position of the beacon along with an identity of the beacon in a memory 104. In some embodiments the mobile device may transmit an absolute position of the beacon to the beacon. The beacon may then transmit its position in its encoded visual information.

Once a mobile device has mapped an environment in this manner, any new beacons added to the environment may have their absolute position determined. In some embodiments mobile devices are capable of uploading information from memory 104 to be distributed to other mobile devices in the system. In some embodiments mobile device may identify certain beacon positions as useful, for example as a position of a charging point and upload this information such that other mobile devices may be aware of it.

As discussed previously a beacon may take several forms. In accordance with a further embodiment of the present application a beacon may take the form of a barcode. In some embodiments the barcode may be visible only in infrared light.

Figure 7:
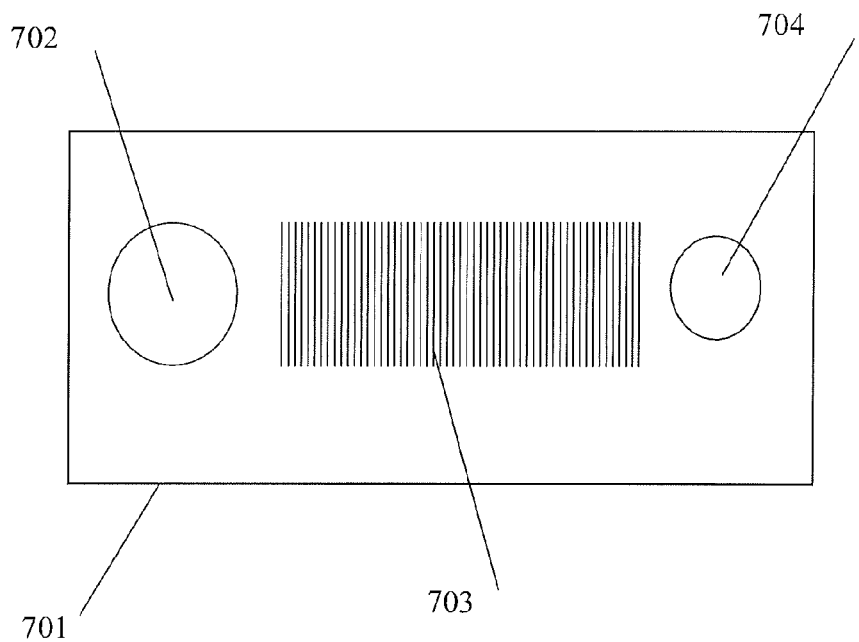
FIG. 7 shows an example of a barcode for use in a further embodiment.
Figure 8:
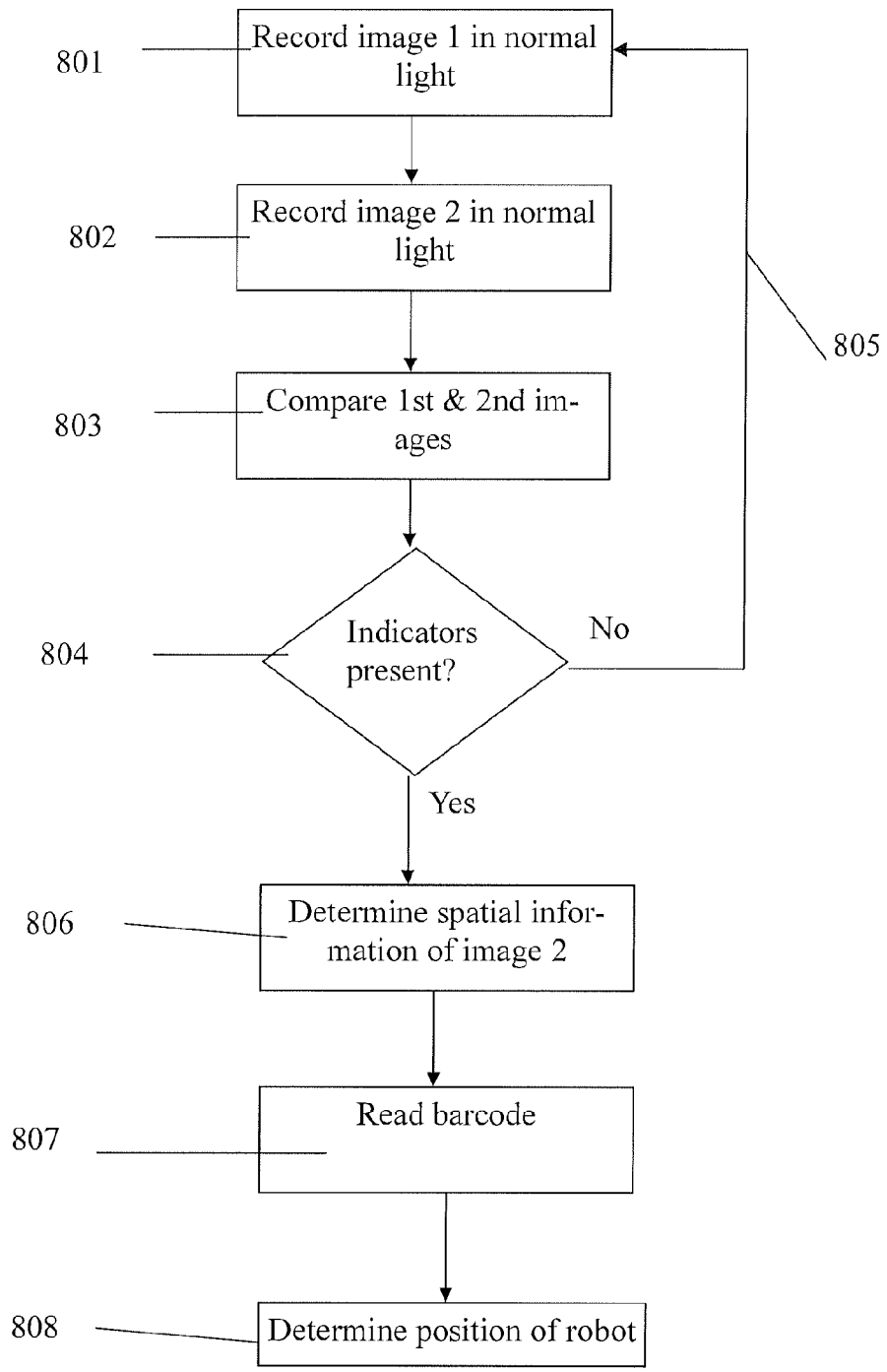
FIG. 8 shows a flow diagram laying out the method steps of a further embodiment.

FIG. 7 shows an example of a barcode that may be used as a beacon in embodiments of the present application. Barcode 701 contains a first indicator 702 and a second indicator 704 with a barcode 703 between the two indicators. FIG. 8 shows a method diagram for carry out embodiments in relation to a barcode such as that of FIG. 7.

In step 801 of FIG. 8 camera/sensor 101 records a first image in normal light. The method proceeds to step 802 where the camera/sensor 101 records a second image using an infrared light. In some embodiments a robot may provide a flash of infrared light as the image is recorded. In step 803 image processor 102 compares the first and second image to determine whether any indicators in the image may be identified. In embodiments the image processor 102 determines whether potential indicators in the second image are not present in the first image. If potential indicators are present only in the second image they may be identified as infrared indicators. The indicators 702, 704 may be shaped such that they are easily identifiable by an image processor and preferably more easily identifiable than a barcode 703. The method then proceeds to step 804 where it is determined whether the indicators 702, 704 are present in the image.

If no indicators are present the method returns to step 801 where the robot may attempt to record another image in normal light and repeat the steps 801 to 804. As discussed previously the distribution of the barcodes may be such that a barcode will always be visible to the robot. Alternatively the robot may advance a certain distance before trying to record an additional image.

If it is determined that indicators are present, the method progresses to step 806 where spatial information of the image is determined. In some embodiments the spatial information may includes the position of indicators 702, 704 relative to the image, the orientation of the indicators 702 and 704 relative to the image and/or determining an area between the indicators. Additionally or alternatively, the size of the indicator in relation to the image may be determined. In some embodiments the beacon 701 is positioned on a ceiling or a floor of the environment. In these embodiments size of the indicators 702 and 704 need not be determined as the beacon may be at a fixed distance from camera/sensor 101. In embodiments indicator 702 and 703 may be identical, alternatively the indicators may be different so that each indicator can be uniquely identified and an orientation may be determined.

At step 806 barcode 807 is read. In some embodiments the image processing unit may look for the barcode 703 in the space between indicators 702 and 704 as determined at step 806. Once barcode 703 is read it is passed onto the position determining unit 103 which matches the barcode 703 against a position in memory 104 in order to determine the absolute position of the beacon 701. This matching in memory may be carried out similarly to the above embodiments. Alternatively the barcode 703 may explicitly contain its own position.

The method then progresses to step 808 where any spatial information of the indicators 702 and 704 determined at step 806 and the absolute position of the barcode 703 determined at step 807 is used to determine an absolute position and orientation of the robot.

In embodiments, the relative position of the indicators 702 and 704 determined in step 806 may be matched against a known orientation of the beacon 703 in relation to the surrounding environments. This match will give an orientation of the barcode 703 with relation to the robot and hence the robots orientation in relation to the environment.

In some embodiments beacon 701 may be printed on labels with reflective printing that shows up in infrared light. In some embodiments, if two barcodes are visible in the recorded image, the image processing circuitry detects or tries to detect a barcode between the visible indicators. In this case the image processor 102 will try to detect a barcode between the dots of each respective barcode. Once at least one barcode 703 has been detected the method of FIG. 8 will continue.

It will be appreciated that this specific description describes example embodiments and is not limiting. Other embodiments will be conceivable by the skilled person without departing from the scope of the appended claims. For example the following features may be apparent.

In FIG. 1 the image processor 102 and positioning determining unit 103 have been depicted as separate units however it will be appreciated that they may be provided by a processor.

The foregoing description describes the beacons as visual indicators with encoded visual information. Although specific examples relate to infrared beacons or beacons visible in infrared light it will be appreciated that embodiments may be applicable to beacons visible in normal light or other light spectrums.

It will also be appreciated that the method steps of the preceding description are not limited to the order in which they are described. For example the beacons may be identified after spatial information has been calculated about the beacons and/or the calculation of spatial information and identification of the beacons may be calculated in parallel or may be done in order. Furthermore it will be appreciated that the methods are not described to the exclusion of additional steps.

Throughout the description reference is made to robot or mobile device. It will be appreciated that these terms may be used to refer to the same object and applies to any device that is capable of moving under its own control. Furthermore embodiments may be applied to different devices operating in the same environment. For example, mail delivery robots in an office may use the same beacons for navigation as an automated vacuum cleaner.

Although the foregoing description describes the applicability of the invention to mobile device such as robots, it will be appreciated that embodiments may be applied as navigation system to any entity requiring navigation that is moving relative to an environment. It will be appreciated that embodiments may also apply to stationary entities in a mobile environment relative to that entity for example in applications such as placing crates with beacons in correct positions on a factory floor.

Alternatively embodiments may be applicable to devices that may be moving under separate entities control but are capable of reporting their position to said entity to be used in navigation. In these embodiments the camera/sensor 100 may be remote to an image processor and may transmit or upload the images.

It will also be appreciated that the embodiment as discussed in relation to FIGS. 1 to 3 may be applicable to all embodiments disclosed herein with the embodiments discussed in relation to FIGS. 4, 5 and 6 and FIGS. 7 and 8 referring to specific examples and their alternatives.

Embodiments refer to matching a beacon identity to position in memory 104. It will be appreciated that this may be carried out in any suitable manner. For example the memory may comprise a table with corresponding entries of position and beacon identity. Alternatively the memory may contain a linked list or other suitable arrangement.

Embodiments may be easily incorporated in applications such as warehouse vehicle automation, automated lawn mower, automated vacuum, model plane guidance and automated charge point docking and any appropriate applications.

The application is being described herein by way of reference to particular non-limiting examples. One example when skilled in the art will understand the general applicability of the application. The scope of protection afforded by the application is to find in the appended claims.

What is claimed is:

1. A method for navigation of a mobile device comprising:
   determining spatial information of at least one beacon detected in an image relative to the image, said image comprising an image of said at least one beacon within at least part of an environment surrounding the mobile device; and
   determining a position of the mobile device based on said spatial information comprising encoded visual information of said at least one beacon and at least two indicators of said at least one beacon detectable only in a restricted wavelength image, said at least two indicators located on either side of the encoded visual information.

2. The method of claim 1 further comprising detecting said at least one beacon within the image based on said encoded visual information indicating a position of said at least one beacon relative to the environment.

3. The method according to claim 2 further comprises:
   determining a position of the at least one beacon relative to the image based on said spatial information; and
   determining a position of the at least one beacon relative to the environment based on said encoded visual information.

4. The method of claim 2 wherein determining a position of the mobile device comprises determining an absolute position and orientation of the mobile device.

5. The method of claim 1 wherein the beacon is an infrared beacon and said encoded visual information is decoded using image processing on said image.

6. The method of claim 1 wherein the encoded visual information indicates an identity of the beacon.

7. The method of claim 6 further comprising matching said identity of said beacon with a position of the beacon relative to the environment stored in a memory of the mobile device.

8. The method of claim 1 wherein said spatial characteristics further correspond to at least one of the size of the beacon within the image or the orientation of the beacon with respect to the image.

9. The method of claim 1 further comprising:
   determining spatial information of at least one further beacon wherein said spatial information comprises an indication of a spatial relationship between the at least one beacon and said at least one further beacon; and
   determining a position of the mobile device based on said spatial information.

10. The method of claim 1 wherein said image has a 360 degree field of vision of the surrounding environment and all of said beacons within said environment are within the image.

11. The method of claim 1, wherein said beacon is a barcode visible only in infrared light and said encoded visual information is encoded in the barcode.

12. The method of claim 1 wherein said method further comprises:
   recording a first image of the beacon in normal light and a second image of the beacon in infrared light, wherein a comparison is made between the two images to determine if the indicators are only present in the second image and image processing is carried out to detect the encoded visual information between the two indicators.

13. The method of claim 12 wherein the two indicators indicate an orientation of the encoded visual information with respect to the mobile device and a comparison between a stored orientation of the encoded visual information and said orientation with respect to the mobile device is carried out to determine an orientation of the mobile device.

14. A method for navigation of a mobile device comprising:
   determining spatial information of at least one beacon detected in an image relative to the image, the beacon comprising a barcode between two indicators visible only in infrared light, the barcode comprising encoded visual information, said image comprising an image of said at least one beacon within at least part of an environment surrounding the mobile device;
   recording a first image of the beacon in normal light and a second image of the beacon in infrared light, wherein a comparison is made between the two images to determine if the indicators are only present in the second image;
   carrying out image processing to detect a barcode between the two indicators; and
   determining a position of the mobile device based on said spatial information comprising the encoded visual information.

15. The method of claim 14 wherein the two indicators indicate an orientation of the barcode with respect to the mobile device and a comparison between a stored orientation of the barcode and said orientation with respect to the mobile device is carried out to determine an orientation of the mobile device.

16. The method of claim 14 further comprising detecting said at least one beacon within the image based on said encoded visual information indicating a position of said at least one beacon relative to the environment.

17. The method according to claim 16 further comprises:
   determining a position of the at least one beacon relative to the image based on said spatial information; and
   determining a position of the at least one beacon relative to the environment based on said encoded visual information.

18. The method of claim 16 wherein determining a position of the mobile device comprises determining an absolute position and orientation of the mobile device.

19. The method of claim 14 wherein the encoded visual information indicates an identity of the beacon.

20. The method of claim 19 further comprising matching said identity of said beacon with a position of the beacon relative to the environment stored in a memory of the mobile device.

21. The method of claim 14 wherein said spatial characteristics further correspond to the orientation of the beacon with respect to the image.

22. A method for navigation of a mobile device comprising:
   recording a first image of a beacon in normal light and a second image of the beacon in infrared light;
   comparing the first and second image to determine if two infrared indicators are only present in the second image;
   carrying out signal processing to detect a barcode between the two infrared indicators;
   reading the barcode.

23. The method of claim 22 further comprising determining a position of the mobile device based on the barcode.

24. The method of claim 22 wherein the two indicators indicate an orientation of the barcode with respect to the mobile device and a comparison between a stored orientation of the barcode and said orientation with respect to the mobile device is carried out to determine an orientation of the mobile device.

25. An apparatus comprising:
an imaging device operable to obtain an image comprising an image of at least one beacon within at least part of an environment surrounding a mobile device;
a processing device operable to determine spatial information of said at least one beacon detected in the image relative to the image and determine a position of the mobile device based on said spatial information;
said processing means further being operable to determine said spatial information based on encoded visual information of said at least one beacon and at least two indicators of said at least one beacon detectable only in a restricted wavelength image, said at least two indicators located on either side of the encoded visual information.

26. An apparatus comprising:
means for determining spatial information of at least one beacon detected in an image relative to the image, the beacon comprising a barcode between two indicators visible only in infrared light, the barcode comprising encoded visual information, said image comprising an image of said at least one beacon within at least part of an environment surrounding the mobile device;
means for recording a first image of the beacon in normal light and a second image of the beacon in infrared light, wherein a comparison is made between the two images to determine if the indicators are only present in the second image;
means for carrying out image processing to detect a barcode between the two indicators; and
means for determining a position of the mobile device based on said spatial information using the encoded visual information.

27. A computer readable medium comprising computer instructions for:
determining spatial information of at least one beacon detected in an image relative to the image, said image comprising an image of said at least one beacon within at least part of an environment surrounding the mobile device; and
determining a position of the mobile device based on said spatial information;
wherein determining said spatial information is based on encoded visual information of said at least one beacon and at least two indicators of said at least one beacon detectable only by implementing a wavelength of electromagnetic radiation within a restricted range, said at least two indicators located on either side of the encoded visual information.

28. A computer readable medium comprising computer instructions for:
determining spatial information of at least one beacon detected in an image relative to the image, the beacon comprising a barcode between two indicators visible only in infrared light, the barcode comprising encoded visual information, said image comprising an image of said at least one beacon within at least part of an environment surrounding the mobile device;
recording a first image of the beacon in normal light and a second image of the beacon in infrared light, wherein a comparison is made between the two images to determine if the indicators are only present in the second image; and
carrying out image processing to detect a barcode between the two indicators;
determining a position of the mobile device based on said spatial information;
wherein said determining spatial information is based on the encoded visual information.

* * * * *